3,654,267
PROCESS FOR THE RESOLUTION OF RACEMIC 3-SUCCINYLOXY - 5 - PHENYL-1,3-DIHYDRO-2H-1,4 - BENZODIAZEPINE - 2-ONE-DERIVATIVES INTO OPTICAL ANTIPODES
Giancarlo Jommi and Giovanna Riva, Milan, Francesco Mauri, Sesto San Giovanni, and Luigi Mauri, Villa Santa, Italy, assignors to Ravizza S.A., Lausanne, Switzerland
No Drawing. Filed Mar. 25, 1970, Ser. No. 22,673
Claims priority, application Great Britain, Apr. 8, 1969, 18,034/69; Feb. 28, 1970, 9,759/70
Int. Cl. C07d 53/06
U.S. Cl. 260—239.3         5 Claims

ABSTRACT OF THE DISCLOSURE

Invention concerned with a process for the resolution into optical antipodes of racemic compounds comprised in the general formula

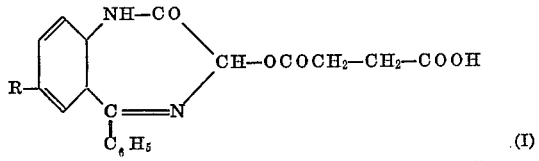

wherein R is $NO_2$, Cl, F, Br, based on the sharply different solubility in ethylacetate of the salts of the dextro-forms and levo-forms with (+)ephedrine or (−)ephedrine.

---

The present invention is concerned with a process for the resolution into optical antipodes of racemic compounds comprised in the general formula

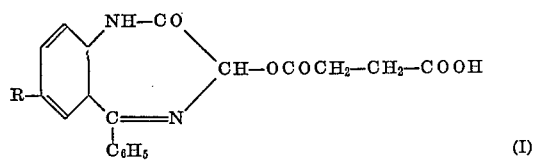

wherein R is $NO_2$, Cl, F, Br.

In what follows, for the sake of simplicity, the compounds of Formula I will be identified with the terms 7-$NO_2$-hemisuccinate, 7-Br-hemisuccinate and so on.

It is known that the 1,4-benzodiazepines constitute a class of drugs showing a remarkable psycoactivity.

Recently the racemic 7-Cl-hemisuccinate was studied and it was found endowed with a remarkably interesting activity, superior under some respects to that of notoriously valuable benzodiazepines such as chlordiazepoxide. Such a result has been confirmed by the applicant also with the remaining hemisuccinates of Formula I.

The racemic hemisuccinates may easily be prepared for example by esterification of the corresponding 3-hydroxy derivatives with succinic anhydride, preferably in the presence of pyridine or of other tertiary bases used in such an amount to act also as a reaction medium.

The hemisuccinates, besides showing, as said, a very valuable activity on the central nervous system, present the great advantage of being easily salified by neutralization with an equimolecular amount of an organic or inorganic base and thus transformed in water-soluble hemisuccinates; these aqueous solutions may be easily administered by parenteral route, what form of administration is not possible today with any other benzodiazepine. The advantage of the treatment by injection resides in that a rather immediate therapeutic effect may be obtained. Particularly good results have been obtained with sodium hemisuccinates.

We have now found that of the two optically active isomers which constitute the racemic hemisuccinates of Formula I, the dextro rotatory form is by far more active than the levorotatory one.

It is immediately evident how advantageous it would be to eliminate the poorly active levo-form while obtaining in the pure state the highly active dextro-form which produces the same therapeutic effect at by far lower doses and thus with by far lower toxic effects.

We have now found a process which allows the resolution of the racemic hemisuccinates of Formula I in a simple and economical manner leading to the dextrorotatory hemisuccinate in high yields; the levo-rotatory hemisuccinates may be also recovered in high yields, hydrolyzed to the racemic 3-hydroxy compounds, these again esterified to the racemic hemisuccinates and as such recycled.

The process object of the present invention is based on the discovery that the salts of the (+)hemisuccinates and (−)hemisuccinates with (+)ephedrine or (−)ephedrine have a sharply different solubility in ethylacetate. More precisely the salts formed by the (+)hemisuccinates of Formula I with (−)ephedrine show a very low solubility in ethyl acetate, while the salts of the (−)hemisuccinates with (−)ephedrine are highly soluble in the same solvent. The solubility of the (−)ephedrine ((+)hemisuccinates in ethyl acetate is still remarkably lower in the presence of the salts (−)ephedrine (−)hemisuccinate.

When the (+)ephedrine is used as salifying compound, the two salts obtained show an opposite behaviour, with respect to the solubility in ethyl acetate, when compared with the salts of (−)ephedrine; that is the salts of the (+)hemisuccinates with (+)ephedrine are highly soluble in ethyl acetate, while the salts of the (−)hemisuccinates with (+)ephedrine are nearly insoluble in the same solvent.

Between the two alternatives of the process, that using the (−)ephedrine in the preferred one, since to obtain the (+)hemisuccinates as a precipitate rather than as a solution, accounts for a higher purity of the desired product. In an indicative manner it may be said that the solubilities in ethyl acetate at 50° C. of the (−)ephedrine salts of (+)hemisuccinates and of (−)hemisuccinates of Formula I are nearly as follows:

|  | Mg./cc. |
|---|---|
| (−)ephedrine (+)hemisuccinate | 1 |
| (−)ephedrine (−)hemisuccinate | 50 |

The solubility of the (−)ephedrine (+)hemisuccinates in ethyl acetate is still lower in the presence of the salts (−)ephedrine (−)hemisuccinate.

Taking advantage of the characteristics of solubility in ethyl acetate of the salts with (−)ephedrine of (+)hemisuccinates and (−)hemisuccinates of Formula I the following industrial process has been set up. The racemic hemisuccinates and the (−)ephedrine are made to react in hot ethyl acetate, the amount of the solvent being proportionated in such a manner to be sure that the whole (−)ephedrine (−)hemisuccinate salt formed remains in solution. To operate with a salt concentration between 2 and 15% is generally appropriate. The most of the formed (—)ephedrine (+)hemisuccinate precipitates from the warm solution. With certain hemisuccinates and depending on the salt concentration adopted at the start, it is convenient to cool the reaction mixture to 10° C. with a water-ice bath to obtain a complete precipitation. The formed crystalline precipitate, consisting essentially of (—)ephedrine (+)hemisuccinate, is filtered, dissolved in a suitable solvent and hydrolyzed with an acid.

According to a preferred embodiment of the invention, the hydrolysis is carried out with acetic acid which is suitable to act both as a solvent and as hydrolysing agent. Moreover, acetic acid does not cause any yellowing of the product, as mineral acids do. By dilution with water up to incipient crystallization and successive cooling, the pure (+)hemisuccinate crystallizes out, is dried and may be recrystallized from a suitable solvent such as for example acetic acid/water or ethyl-alcohol/water. In order to render the process economically more convenient, it is always preferred to recover the (—)hemisuccinate contained in the solution under the form of salt with ephedrine.

To perform such a recovery, the following procedure is adopted: the solution wherefrom the crystals of (—)ephedrine (+)hemisuccinate have been removed, is evaporated under vacuum up to dryness. The residue is dissolved with acetic acid (preferably at 50–60° C.) and taken up with water to incipient crystallization.

The (—)hemisuccinate which precipitates, is dissolved in a solvent for example in ethyl alcohol, added with an excess of aqueous 4 N NaOH under stirring and kept still under stirring up to complete precipitation. The precipitate is dissolved with water and from the clear solution the racemic 3-hydroxy compounds are precipitated by acidification, preferably with acetic acid. The racemic 3-hydroxy compound is esterified with succinic acid and as such recycled.

As initially said, the separation of (+)hemisuccinate and (—)hemisuccinate can be carried out also through the salts with (+)ephedrine, by following nearly the above technique with only the obvious variations.

However, as said, this method is less convenient than that performed through the (—)ephedrine, due to the (+)ephedrine (+)hemisuccinate salt remaining in solution being removable only with lower yields and with a lower degree of purity.

In order to better describe the separation object of the present invention, illustrative but not limitative examples are reported hereinafter.

EXAMPLE 1

10 g. of racemic 7-NO₂-hemisuccinate are dissolved under stirring and refluxing into 250 cc. of ethyl acetate. To this solution 4.2 g. of (—)ephedrine dissolved in 20 cc. of ethyl acetate are added dropwise. A remarkable amount of crystals precipitates within a few seconds. Heating is discontinued and the mixture is allowed to cool under stirring up to 50–60° C. At this temperature the mass of precipitated crystals is filtered, washed with ethyl acetate and dried. 6.75 g. of (—)ephedrine (+)7-NO₂-hemisuccinate are obtained.

The filtrate (A) is set aside, to undergo successive recovery procedure. The salt (—)ephedrine (+)7-NO₂-hemisuccinate is dissolved in 50 cc. of glacial acetic acid at 60° C., added with hot water up to incipient crystallization, cooled and filtered. 4.25 g. of (+)7-NO₂-hemisuccinate are obtained which, after recrystallization from ethyl alcohol/water show the following characteristics:

Analysis of (+)7-NO₂-hemisuccinate·2H₂O

|   | Calculated | Found |
|---|---|---|
| C | 52.65 | 52.74 |
| H | 4.38 | 4.15 |
| N | 9.70 | 9.74 |

M.P.=136° C.; $[\alpha]_D^{20}$=−395° (c.=1% in dioxane).

This highly pure ester is ready to be used, as such or as salt, in the therapeutic field.

The filtrate (A) is evaporated under vacuum to dryness and the residue is taken up at 60° C., up to dissolution, with the smallest possible quantity of acetic acid. By addition of water and cooling 4.1 g. of (—)7-NO₂-hemisuccinate precipitate which are separated by filtration is dissolved in 100 cc. of 95° ethyl alcohol. To this solution 12.5 cc. of 4 N NaOH are added dropwise, after about 15 minutes stirring a precipitate is obtained, which is redissolved by addition of 100 cc. water; the solution is acidified with acetic acid.

The crystalline precipitate is filtered and recrystallized from dioxane. 2.6 g. of racemic 7-NO₂-3-oxy-5-phenyl-1,4-dihydro-2H-1,4-benzodiazepine-2-one are obtained ready for esterification with succinic acid and recycling.

EXAMPLE 2

10 g. of racemic 7-Cl-hemisuccinate are dissolved under stirring into 140 cc. of hot ethyl acetate.

To this solution, 4.3 g. of (—)ephedrine dissolved in 20 cc. of ethyl acetate are added dropwise.

A remarkable amount of crystals precipitates within a few seconds. Heating is discontinued and the mixture is allowed to cool under stirring. When the room temperature is reached the mixture is further cooled to 10° C. with water-ice and at this temperature kept over one hour. The mass of precipitated crystals is filtered, washed with anhydrous ethyl acetate and dried. 6.75 grams of (—)ephedrine (+)7 - Cl - hemisuccinate are obtained showing the following characteristics:

M.P.=159–160° C.; $[\alpha]_D^{20}$=+127° (c.=3% in DMF).

The filtrate (A) is temporarily set aside.

The salt (—)ephedrine (+)7-Cl-hemisuccinate is dissolved in 50 cc. of glacial acetic acid at 70–80° C., added with hot water up to incipient crystallization, allowed to crystallize by cooling.

4.25 g. of (+)7-Cl-hemisuccinate are filtered out which, after recrystallization from ethyl acetate/hexane, show the following characteristics;

M.P.=158–159° C.; $[\alpha]_D^{20}$=+152° (c.=2% in 95° ethyl alcohol.)

This highly pure ester is ready to be used, as such or as sodium salt, in the therapeutic field.

The filtrate (A) is added with 2 cc. glacial acetic acid, evaporated under vacuum to dryness and the residue is taken up, up to dissolution, with the smallest possible quantity of acetic acid, at 70–80° C. By addition of water and cooling 4.1 g. of (—)hemisuccinate precipitate which are separated by filtration and dissolved in 100 cc. of 95° ethyl alcohol. This solution is cooled and kept at 10° C., while adding dropwise 51 cc. of N NaOH.

After about 15 minutes stirring, a precipitate is obtained which is filtered off and dissolved in a mixture water-ethyl alcohol 50:50. The solution is acidified with acetic acid.

The crystalline precipitate is filtered and recrystallized from dioxane-water. 2.6 g. of racemic 7-chloro-3-oxy-5-phenyl - 1,4-dihydro-2H-1,4-benzodiazepine-2-one are obtained, ready for esterification and thus recycling.

EXAMPLE 3

10 g. of racemic 7-Br-hemisuccinate are dissolved under stirring into 140 cc. of ethyl acetate.

To this solution, 3.8 g. of (—)ephedrine dissolved in 20 cc. of ethyl acetate are added dropwise.

Following the identical procedure described in the preceding example, 4.5 g. of (+)7-Br-hemisuccinate are obtained which, after recrystallization from ethyl acetate/hexane, show the following characteristics:

*Analysis.*—Calculated for $C_{19}H_{15}N_2O_5Br$ (percent): C, 52.95; H, 3.48; N, 6.49. Found (percent): C, 53.20; H, 3.53; N, 6.51.

M.P.=157° C.; $[\alpha]_D^{20}$=+167° (c.=2% in dioxane).

As initially said, the great importance of the process according to the invention resides in that it provides highly valuable pharmaceutical compounds.

The great advantage of using the (+)hemisuccinates instead of the racemics hemisuccinates is particularly evident when the efficacy indexes of these products are considered.

In the following Table I, the efficacy indexes of the most important among the considered compounds, namely 7-Cl-hemisuccinate and 7-NO$_2$-hemisuccinate are given.

TABLE I

| Efficacy indexes | Rac. 7-Cl-hemisuccinate | (+)7-Cl-hemisuccinate |
|---|---|---|
| I.p. LD 50/I.v. ED 50+ | 298 | 542 |
| I.p. LD/50os ED 50+ | 209 | 259 |
| I.p. LD 50/I.v. ED 50++ | 131 | 215 |
| Os LD 50/I.v. ED 50+ | 351 | 592 |
| Os LD 50/I.v. ED 50++ | 155 | 235 |

| | Rac.7-NO$_2$-hemisuccinate | (+)7-NO$_2$-hemisuccinate |
|---|---|---|
| I.p. LD 50/I.v. ED 50+ | 350 | 741 |

+Test with 120 mg./kg. intraperitoneally injected cardiazol, drug administered 30 minutes ante.
++Test with 200 mg./kg. intraperitoneally injected cardiazol, drug administered 30 minutes ante.

The tests by intraperitoneal or intravenous injection of 7-Cl-hemisuccinates have been performed dissolving the amount to be tested of racemic or (+)hemisuccinate in two drops of diethyl acetamide, then adding 6 cc. of a solvent mixture (A) consisting of:

35 parts by volume of propyleneglycol, 30 p. by v. of glycofurol and 5 p. by v. of benzyl alcohol. Finally 14 cc. of water are added. The concentration of the tested compound has been regulated to inject the product, both intraperitoneally or intravenously, at a dose of 5 cc./kg. of treated animal.

The tests per os have instead been performed dissolving the desired amount of product in 1.5 cc. of mixture (A) and then adding 3.5 cc. of a 5–10% aqueous solution of carboxymethyl cellulose. Also in this case the concentration is so regulated to have the right amount of drug in 5–10 cc./kg. of treated animal, which is the dose administered.

The tests with 7-NO$_2$-hemisuccinates have been performed by injecting 5 cc./kg. of a solution prepared dissolving the desired amount of product in 2 drops of diethylacetamide and then diluting to the desired volume wtih Sörenson buffer solution, having a pH 7.4.

The results obtained in pharmacology have been quite confirmed with the clinical tests.

In order to have data as reliable as possible, the drugs of the invention were administered to healthy men. Moreover the various optical forms of the drugs, namely the dextrorotatory, levorotatory and racemic ones, were administered to the same individuals, spacing the administration of drugs of different optical activity of two weeks.

For all the treated individuals a clear tranquilizing activity resulted only when the dextrorotatory 7-Cl-hemisuccinate and 7-NO$_2$-hemisuccinate were used. No effect at all was noticed with the racemic forms or with the levorotatory forms.

As another demonstration of efficacy of the (+)hemisuccinates of the invention, their absorption and retention in the organism was tested in comparison with that of the racemates and of the levo-forms, by determining the amount of drug eliminated as glucoronate in urine after 24 and 48 hours.

The results obtained with the 7-Cl-hemisuccinates are summarized in the following Table II where the compound eliminated is expressed as a percentage of the drug injected in the organism, respectively (column 1) in the first 24 hours and (column 2) in the successive 24 hours from the administration.

TABLE II

| | (1) | (2) | Total over 48 h. |
|---|---|---|---|
| Racemate | 36.06 | 4.59 | 40.65 |
| Levo-form | 51.06 | 6.36 | 57.42 |
| Dextro-form | 32.29 | 2.23 | 34.52 |

The above data clearly show that the dextro-form is less eliminated by the organism, thus accounting for a stronger action.

What is claimed is:

1. Process for the resolution into optical antipodes of racemic 3 - succinyloxy - 5 - phenyl - 1,3 - dihydro - 2H-1,4-benzodiazepine-2-one derivatives i.e., the compound of the formula

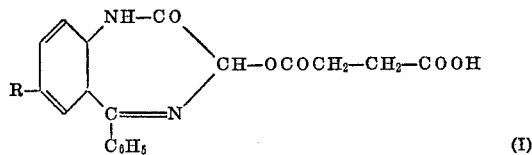

(I)

wherein R is NO$_2$, Cl, Br, F, through selective solubilization in ethylacetate of their salts with optically active ephedrine.

2. Process according to claim 1, wherein the optically active ephedrine is (—)ephedrine.

3. Process according to claim 1 wherein the racemic succinyloxy derivatives of Formula I and (—)ephedrine are made to react in boiling ethyl acetate.

4. Process according to claim 1, wherein an amount of ethyl acetate is used such as to have a salt concentration between 2 and 15%.

5. Process according to claim 1, wherein a nearly quantitative precipitation of the salt with (—)ephedrine of (+)succinyloxy derivatives of Formula I, takes place between 50° and 10° C.

References Cited

UNITED STATES PATENTS 3,445,458  5/1969  Bell _____ 260—239.3 D

OTHER REFERENCES

Gilman, "Organic Chemistry," 2nd Edition (Wiley) (1943), pp. 254–264, in particular pp. 256–260.

HENRY R. JILES, Primary Examiner

R. T. BOND, Assistant Examiner

U.S. Cl. X.R.

260—707; 424—244